Jan. 28, 1969 C. E. PFUND 3,425,033
AUTOMOBILE THEFT ALARM
Filed Oct. 22, 1965 Sheet 1 of 2
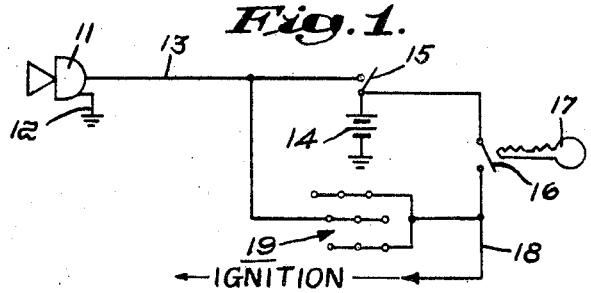
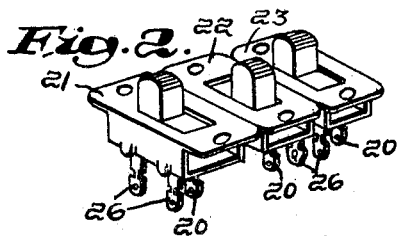
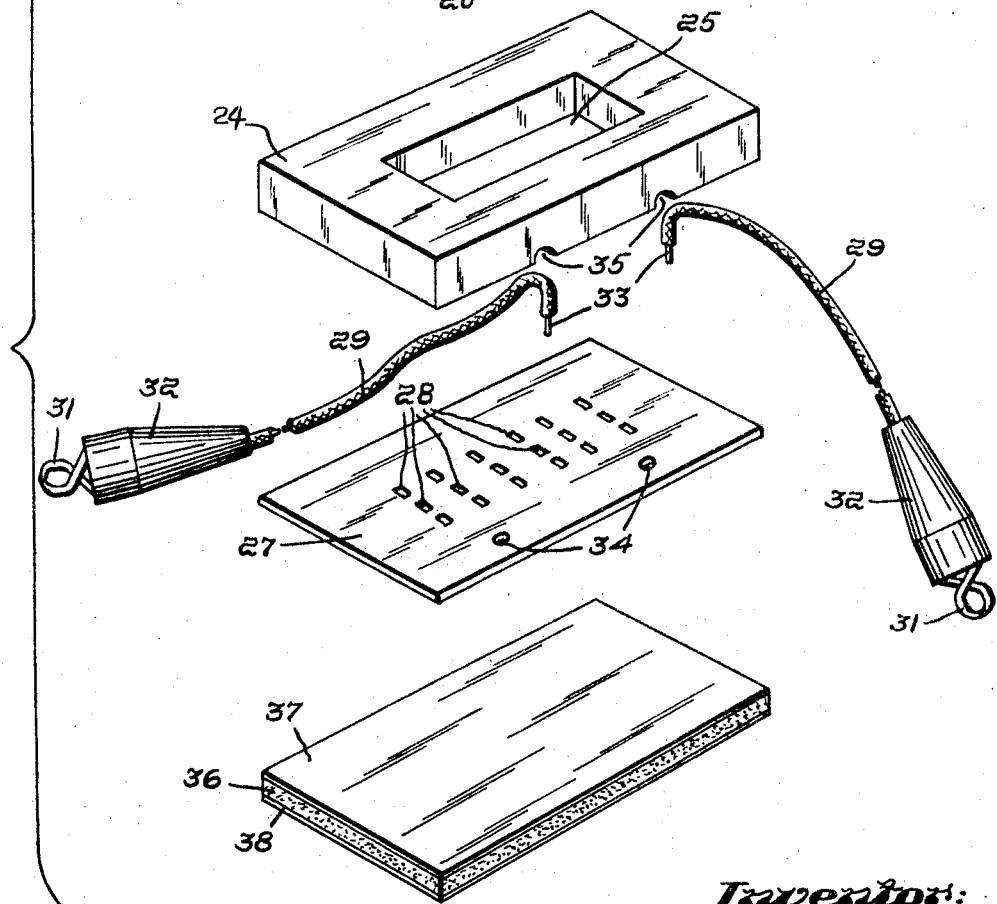
Inventor:
Charles E. Pfund,
by Russell, Chittick & Pfund
Attorneys

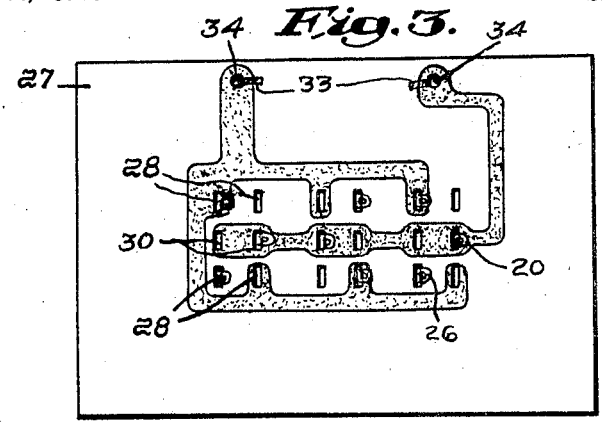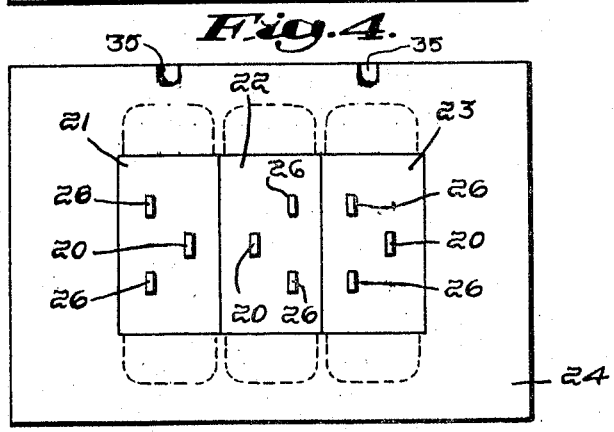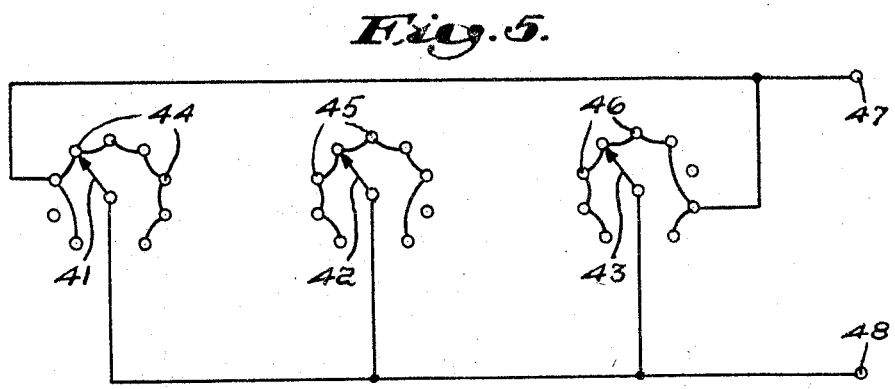

United States Patent Office 3,425,033
Patented Jan. 28, 1969

3,425,033
AUTOMOBILE THEFT ALARM
Charles E. Pfund, 16 Balcarres Road,
West Newton, Mass. 02165
Filed Oct. 22, 1965, Ser. No. 501,825
U.S. Cl. 340—64                                4 Claims
Int. Cl. B60r 25/04, 25/10

ABSTRACT OF THE DISCLOSURE

An automobile theft alarm has a thin rectangular switch housing with a central aperture to receive a plurality of slide switches, the terminals of which project through a printed circuit board and are swaged to hold the assembly together. The orientation of the switches in the aperture determines that switch actuator combination which is open circuit and all other combinations complete an alarm circuit through the leads which are attached to automobile ignition and horn circuits. A double coated adhesive foam covering the printed circuit board provides for mounting the device.

---

This invention relates generally to an automobile theft alarm and more particularly to a simple and economical arrangement for providing an alarm upon unauthorized use of an automobile by any person including one who has a key to fit the ignition of the automobile.

A feature of the invention is to provide an extremely simple and economical device which can be installed in a matter of a few minutes and which will permit the owner of an automobile to provide a measure of protection against unauthorized use of the automobile.

The invention basically provides a selective switching circuit between the circuit which is energized by the ignition key of the automobile and the horn circuit whereby upon actuating the ignition key to operate the vehicle the horn of the automobile sounds an alarm if such use is by an unauthorized person. The selective switching circuit may include a plurality of switching combinations only one of which provides an open circuit between the ignition and the horn circuits of the automobile thereby further complicating the task of the unauthorized person if he attempts to bypass the alarm circuit.

The preferred embodiment of the invention provides a simple article of manufacture consisting of a minimum of parts which can be readily assembled with features for simple and rapid installation of the unit in an automobile in a position near the ignition key where the device can be used by the operator of the automobile without undue inconvenience.

The features and advantages of the invention will become apparent from the following detailed description taken in conjunction with the drawings wherein:

FIG. 1 is a schematic wiring diagram showing the overall circuit of the invention;

FIG. 2 is an exploded view of the component parts of the preferred embodiment of the invention arranged relative to one another as required for assembly;

FIG. 3 is a bottom view of the printed circuit board shown in FIG. 2 after the switch terminals have been swaged;

FIG. 4 is a bottom view of the three slide switches shown in FIG. 2 inserted in the body portion of the device relative to one another for a particular switching combination and prior to adding the circuit board of FIG. 3;

FIG. 5 is a schematic wiring diagram of a circuit having a larger number of switching combinations; and FIG. 6 shows an insulation piercing terminal for permanently connecting the device.

Referring now to FIG. 1 a portion of the electrical circuit of an automobile is indicated as having an audible horn 11 which generally has one terminal grounded at 12 and a wire lead 13 supplied with current from the automobile battery 14 upon closure of a switch 15. The switch 15 may be the horn button on the steering wheel or a relay closure actuated by the horn button depending upon the automobile system.

The automobile battery 14 also supplies the ignition system lead 18 of the car through a switch 16 actuated by key 17. Various other circuits are energized from lead 18 upon the closure of the switch 16 by means of the key 17. In general the unauthorized use of the automobile requires that switch 16 be closed or otherwise bridged by means of wire connections as ordinarily relied upon by automobile thieves so that the closure of switch 16 in any manner results in energization of lead 18 whenever the automobile is rendered capable of running. In accordance with the present invention a switching system generally indicated as 19 is connected between the lead 18 and the lead 13 of the horn 11. Depending upon the degree of security desired, the switching system 19 may be more or less complex as desired.

In the operation of the system of FIG. 1 the switching system 19 is closed whenever the automobile is to be left unattended and it is desired to provide the audible alarm protection of the present invention. If an unauthorized use of the automobile occurs the switch 16 will be closed or effectively short circuited by means of wire jumper connections and for this condition the energization of the ignition lead 18 supplies energy through the closed switching system 19 to lead 13 and sounds the automobile horn 11 to give an audible alarm of the unauthorized use. When the owner of the vehicle returns and wishes to operate the vehicle he will actuate the switching system 19 to be open circuited and the normal closure of ignition switch 16 energizes the ignition lead 18 without sounding the horn 11.

The preferred embodiment of the present invention is shown in FIG. 2 and provides for the switching system 19 a series of three slide switches of the single pole double throw type to provide eight different combinations of switch positions any one of which can be made the true or open circuited condition for the switching system 19 in the circuit of FIG. 1. In the present preferred embodiment the eight different open circuit switching combinations are obtained when the units are manufactured by merely reversing the position of the slide switches in various combinations as they are inserted into the accompanying printed circuit board.

Slide switches 21, 22 and 23 are mounted on a fibre board or other dielectric material block 24 which has a rectangular aperture 25 that is approximately the size of the rectangular body of the switches 21, 22 and 23 when they are in side-by-side position as shown. When the switches 21, 22 and 23 are dropped into the aperture 25 terminals 20 and 26 on the switches project through the aperture 25 far enough to project through a printed circuit board 27 which is apertured at 30 and 28 to correspond respectively to the pattern of terminals 20 and 26. Two insulated leads 29 are also provided with the distal ends terminating in spring clip electrical contacts 31 with insulating sleeves 32 if desired. The leads 29 are stripped to the bare wire at 33 and the stripped ends 33 project through holes 34 in the printed circuit board 27. The block 24 also has angular grooves 35 in one edge which register above the holes 34 on the printed circuit board 27 when the board 27 and block 24 are brought together to permit the wires 29 to extend outwardly from the side of the assembled unit through the grooves 35.

The block 24 with the switches 21, 22, 23 therein is assembled to the printed circuit board 27 by inserting switch terminals 20 and 26 through the holes 28 and swaging the terminals to mechanically hold the parts together. The unit is then dip soldered to make the swaged terminal positions permanent and to complete the electrical portion of the circuit which is on the bottom of the printed circuit board 27. The unit can then be finished by attaching an insulated layer of material beneath the printed circuit board and this can be done conveniently with a layer of "Scotch" foam 36 which originally has protective release paper layers 37 and 38 thereon. One pressure sensitive adhesive surface of the foam layer 36 is exposed by stripping off the layer 37 and the foam 36 is attached to the underside of the printed circuit board 27 by pressing the adhesive layer firmly against the soldered printing wiring and the remaining areas of the under side of the board 27.

The unit is then ready for mounting underneath the dashboard of an automobile in which it is to be used or in any other convenient location by merely stripping off the release paper layer 38 and pressing the unit with the exposed pressure sensitive adhesive against a suitable surface of the dashboard or other location in the automobile. By using a layer of foam 36 which is approximately ⅛ inch thick the irregularities on the under surface of the printed circuit board 27 and the slight curvature of the surface on the dashboard to which the unit is attached can be accommodated by compression of the foam layer as the unit is pressed into place. Once the unit is mounted on the dashboard the terminals 31 are connected to circuits corresponding to leads 13 and 18 in FIG. 1.

FIG. 3 shows the under side of printed circuit board 27 arranged to provide eight different switching combinations between the two printed circuits extending from the holes 34 with single-pole double-throw switches having terminals asymmetrically arranged as described hereinafter with respect with FIG. 4. As shown in FIG. 3, the array of holes 28 and 30 for each switch permits the switch to be inserted into the printed circuit board 27 in either of two positions. This can be visualized by considering the under side of switch 21 as shown in FIG. 4. As will be readily understood, the terminal 20 is switched between making electrical connection to either of the contact terminals 26 by manipulation of the slide actuator. Assuming that the slide actuator is at the top in FIG. 4, the terminal 20 will make electrical connection with the upper terminal 26. It will be apparent that if the entire switch 21 were rotated 180° prior to insertion in the aperture 25 the contacts would be reversed and this condition is actually shown for switch 22 in FIG. 4. Under these conditions the switch 22 would make electrical contact between terminal 20 and the bottom terminal 26 with the switch actuator for switch 22 toward the bottom in FIG. 4. Similarly switch 23 is inserted with the contact terminals like switch 21 to make contact between terminal 20 and the upper one of terminals 26 with the actuator set toward the top in FIG. 4.

If now the switches are arranged in FIG. 4 (with the actuators set as just described) were inserted in the holes 28 and 30 of the printed circuit board 27 with the terminals projecting through the holes as viewed in FIG. 3 the switches would all make contact between the wires 29 connected to the printed circuit at the portions surrounding the holes 34. The exact opposite placement (i.e., 21 down; 22 up; 23 down) of the switch actuators from that previously described would produce an open circuit between the terminal holes 34 of the printed circuit and this, in fact, is the only combination of switch positions for switches inserted as shown in FIG. 4 which would provide an open circuit. This open circuit combination of actuator positions is indicated in FIG. 2 where the positions of actuators for switches 21 and 23 are "down" and the position of actuator for switch 22 is "up." Any of the other eight combinations of the switch actuator positions to obtain the open circuit condition for the unit can be obtained when the unit is being manufactured by merely rotating different ones of the switches 21, 22, or 23 as they are inserted in the assembly of the unit. Obviously the unit can be wired individually to obtain the eight different switching combinations rather than employing the orientation of switches with the special printed circuit configuration of FIG. 3 to obtain the combinations.

It should be noted that the physical and electrical relations involved in the disclosed embodiment permit the eight different combinations to be obtained with the printed circuit of FIG. 3 using identical single-pole single-throw switches. Thus a switch with a terminal 20 and only one terminal 26 (instead of two) can be inserted to perform the function of any of the switches 21, 22 or 23. Utilizing this feature simplifies the insertion of the switch terminals through the holes in the printed circuit board 27 since only six terminals need to be registered with the holes in the board. This modification is to be understood as included within the scope of the claims when a single-pole double-throw switch is recited.

Referring to FIG. 5 a schematic embodiment of a switching system 19 as shown which employs rotary switches having a plurality of contacts. Thus switches 41, 42 and 43 make contact with a multiple point terminal set 44, 45, 46. As indicated each multiple contact set 44, 45, 46 is wired together except for one terminal and thus only one position in each of the switches 41, 42, 43 provides an open circuit between the terminals 47, 48. Thus a great many more switching combination possibilities are available than with the simple two-position slide switches of FIG. 2. and such switches can be employed wherever greater security is desired. For example with the nine position switches shown in FIG. 5 a total of 999 different switching combinations is available and the random probability of obtaining the open circuit condition is 1 in 999.

FIG. 6 shows an insulation piercing terminal 49 on the distal end of the lead 29. The terminal 49 can be used instead of the spring clips 31 to obtain a rapid permanent installation by crimping the terminal 49 on each of the leads 29 to the respective leads 13 and 18.

Various modifications of the present invention will now be apparent in the light of the present disclosure and changes in the assembly or details of the unit may also be made. For example more or less slide switches could be used to obtain more or less combinations for the switching system 19.

I claim:

1. A theft alarm for an automobile having a battery voltage circuit normally energized by operation of an ignition switch whenever the engine of the automobile is operated and an audible horn on said automobile normally energized upon actuation of the horn switch on said automobile said theft alarm comprising:
   a plurality of $n$ single-pole switches each having a body portion with thickness dimension less than the dimensions transverse to said thickness dimension and a finger actuator extending therefrom;
   a flat housing having an apertured face to receive said plurality of switches, said housing being substantially the thickness of said body portions of said switches to receive said switches with said finger actuators extending from said face;
   a pair of leads extending from said housing;
   a direct conductive circuit connecting the terminals of said switches assembled in said housing to provide selectively $2^n-1$ closed circuits and one open circuit between said leads; and
   an adhesive backing for said housing opposite said face for mounting said theft alarm by adhesive contact with a dashboard surface of said automobile whereby said leads can be connected directly to said battery voltage circuit and said horn.

2. A switching device comprising
   (a) a plurality of $n$ rectangular body single-throw switches each having a set of switched terminals asymmetrically arranged on the back of said rectangular body;

(b) a housing apertured to receive said plurality of switch body portions in side-by-side relation with either the same or 180° relative orientation;

(c) a circuit board adapted to fit said housing and receive said terminals through apertures in said board when said switches are placed in the aperture of said housing;

(d) a first circuit on said circuit board connected to one terminal of said set on each switch irrespective of orientation of said switch body in said aperture in said housing;

(e) a second circuit on said circuit board connected to the other terminal of said set on each switch irrespective of the orientation of said switch body in said aperture in said housing; and (f) leads connected to each of said circuits on said circuit board, the two possible orientations of said body portions in the aperture in said housing providing $2^n$ position combinations for the switch actuators and $2^n-1$ closed circuit combinations between said leads without change in the wiring on said circuit board.

3. The device according to claim 2 in which said switches have flanges extending beyond the area of said aperture in said housing and the terminals of said switches are swaged after passing through said apertures in said circuit board, the flanges and swaged terminals on said switches mechanically securing said housing, switches and circuit board together as a complete unit.

4. The device according to claim 3 and including a double-faced adhesive foam layer one surface of said foam adhering to said circuit board to electrically insulate the circuit board and to provide a mounting means for the unit with the remaining adhesive surface of the foam.

References Cited

UNITED STATES PATENTS

| | | | |
|---|---|---|---|
| 2,517,619 | 8/1950 | Ainley | 177—314 |
| 2,583,752 | 1/1952 | Smith | 177—314 |
| 2,843,843 | 7/1958 | Davis | 340—276 |
| 2,964,733 | 12/1960 | Raju | 340—63 |

JOHN W. CALDWELL, *Primary Examiner.*

ALVIN H. WARING, *Assistant Examiner.*

U.S. Cl. X.R.

200—43; 307—10